W. L. BLISS.
CONTINUOUS FOOT CAP.
APPLICATION FILED JAN. 9, 1912.

1,071,869.

Patented Sept. 2, 1913.

Witnesses:
Robert H. Weir
Geo. B. Jones

Inventor
William L. Bliss.
By: Edwin B. H. Tower Jr.
Atty.

UNITED STATES PATENT OFFICE.

WILLIAM L. BLISS, OF NIAGARA FALLS, NEW YORK, ASSIGNOR TO THE UNITED STATES LIGHT & HEATING COMPANY, OF NEW YORK, N. Y., A CORPORATION OF MAINE.

CONTINUOUS FOOT-CAP.

1,074,869.      Specification of Letters Patent.      Patented Sept. 2, 1913.

Application filed January 9, 1912. Serial No. 670,278.

*To all whom it may concern:*

Be it known that I, WILLIAM L. BLISS, a citizen of the United States, residing at Niagara Falls, in the county of Niagara and State of New York, have invented new and useful Improvements in Continuous Foot-Caps, of which the following is a full, clear, concise, and exact description, reference being had to the accompanying drawing, forming a part of this specification.

My invention relates to a continuous foot cap or device for increasing the security with which a car lighting generator is attached to its supporting frame on the car truck.

In modern car lighting systems it is customary to mount the generator on a supporting frame extending beyond the end of one of the car trucks. One kind of generator supporting frame which has gone into extensive use is a swinging cradle or carriage including two parallel cross-bars on which the generator is removably mounted. The generator is provided with a pair of downwardly extending feet or lugs on each side. These lugs rest directly on the cross-bars and are usually provided with caps bolted thereto from beneath so that each lug with its cap bolted in place forms a closed construction completely surrounding the cross-bar.

One of the objects of my invention is to provide means for increasing the security of the attachment of the generator to the cross-bars by the employment of which means the probability of losing one or more of the securing caps in service is eliminated.

Another object is to provide a continuous foot cap extending from one cross-bar to the other and coöperating with opposite lugs of a pair, whereby this single means is sufficient to secure the generator at two points.

A further object is to provide a securing device for a car lighting generator which shall effectively hold the generator to one of the cross-bars by virtue of its attachment to an intermediate point in the generator and to the opposite side of the generator from said cross-bar and independently of the securing bolts or studs on the adjacent side, which securing bolts or studs may be lost, due to long continued vibration.

In the accompanying drawings I have illustrated a preferred form of foot cap shown in connection with a car lighting generator and generator suspension to illustrate the manner in which the same is used in practice.

Figure 1:
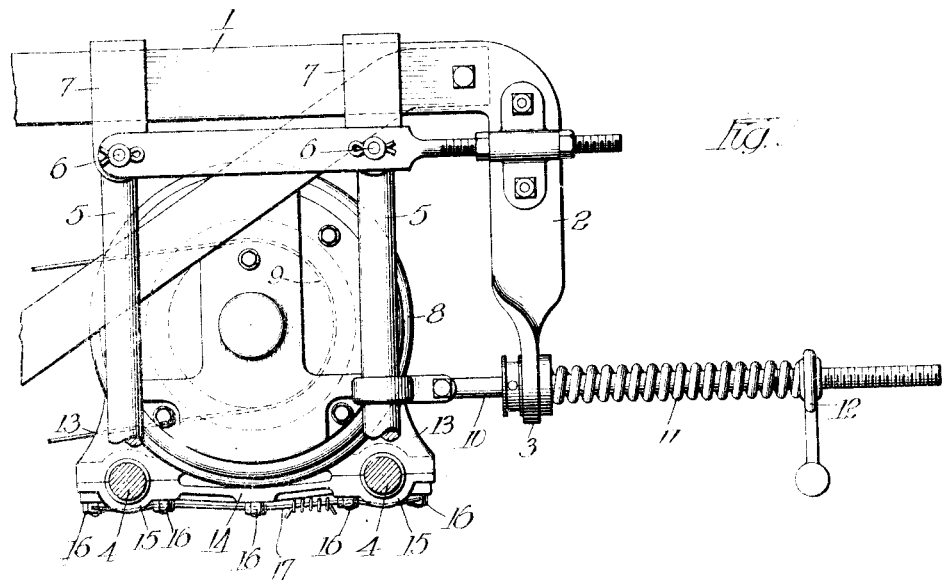
Figure 2:
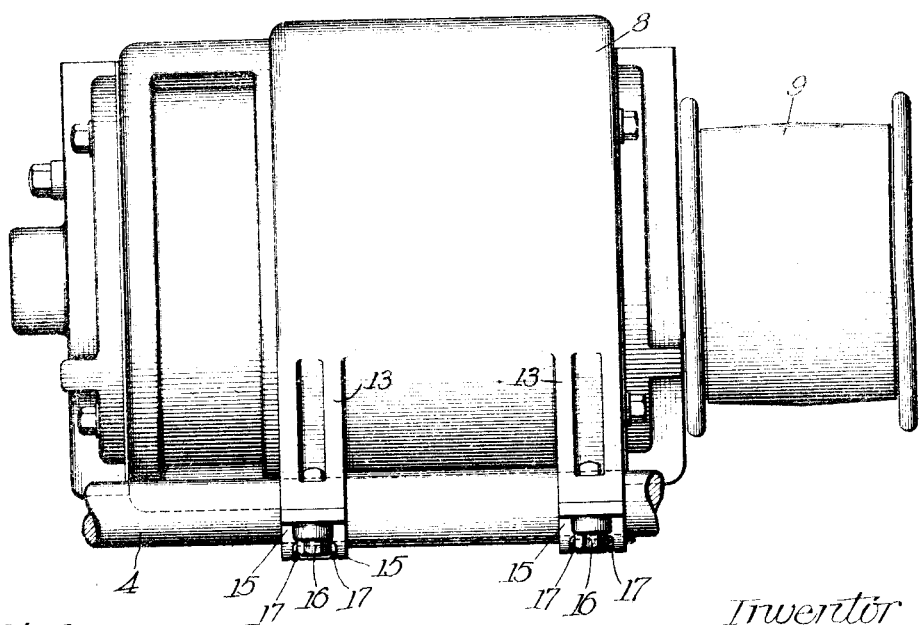

The views of the drawings are as follows:

Figure 1 is a side elevation of a portion of a generator suspension showing one of the foot caps in side elevation. Fig. 2 is an end view on an enlarged scale of a portion of the construction shown in Fig. 1 and showing an end elevation of the foot caps.

The generator suspension selected for the purpose of illustration comprises a pair of substantially parallel suspension bars 1 spaced apart and projecting beyond the end of a car truck. In Fig. 1 only one bar appears as the second is hidden from view by the first bar. Each bar is provided with a downwardly extending end 2 having a twisted extremity 3. The generator is supported directly on a pair of substantially parallel cross-bars 4 having their ends preferably bent upward in the form of depending links 5 pivoted at 6 to stirrups 7, carried by the suspension bars 1. The cross-bars 4 and the links 5 constitute what might be termed a swinging cradle adapted to support the car lighting generator 8. The generator is driven by a driving belt, which passes around a pulley on the car axle not shown and passes also around the pulley 9 on the generator armature shaft. This driving belt extends to the left, as shown in Fig. 1, and tension on the belt is maintained by a tension device comprising the tension rod 10 passing through an opening in the twisted extremity 3, spring 11 and tension wrench 12. As the belt tension is adjusted from time to time by the tension wrench 12, which varies the effective thrust exerted by the spring 11, the generator tends to swing to a new position with respect to that shown in Fig. 1. During such movement of the generator the cross-bars 4 rotate slightly with respect to the generator, which latter always remains in upright position in any position of adjustment of the spring tensioning device. The generator is provided on opposite sides with a pair of downwardly extending feet or lugs 13 which rest on the cross bars 4 and conform to the circular section thereof, thereby permitting the slight relative rotation referred to. In order to securely hold the generator to the cross-bars and at the same time permit this slight relative rotation of the cross-bars with respect to the generator and permit transverse adjustment, I provide a continuous foot cap 14. This foot cap has a substantially semi-circular portion 15 at each end adapted to fit over the lower half of the cross-bars 4. The foot cap is secured to the generator preferably by studs 16, a pair of studs being used immediately adjacent each cross bar 4 and on opposite sides thereof, and an additional fifth stud being applied about the middle of the foot cap. Each end portion 15 of the foot cap accordingly acts as a cap for the corresponding foot or lug 13 of the generator and with said lug completely incloses crossbar 4, thereby preventing the generator from being jolted off the cross-bars when the car truck is traveling at a high rate of speed. If the cap portions 15, instead of being connected by an intermediate member, were entirely separate and distinct from each other it might happen that the studs securing one of the caps in place might become loose, due to long continued vibration, and might possibly drop from place and thereby permit the cap to drop off.

If both caps on the same cross-bar should happen to be lost at the same time there would be danger of the generator being jolted from said cross-bars and dropping down to a position where it might be torn loose altogether from its supporting frame, and cause very serious damage to the moving train. By connecting the caps 15 by an intermediate portion so as to form an integral structure 14 or continuous foot cap, the danger of such an occurrence as just described is greatly lessened, if not rendered absolutely impossible. By threading a wire 17 through openings in the heads of all of the five studs which pass through each foot cap, I am, in fact, enabled to prevent turning or loosening of any of the studs and thereby entirely eliminate the possibility of loss of the generator in the manner described. The wires 17 need not be employed since with this construction the generator would still be securely held even though several of the studs were lost from the continuous foot cap. For example, if both studs should drop from one of the cap portions 15, the studs in the other cap portion and the middle stud would hold the foot cap securely in place. In fact, as long as one stud remains securely in place the foot cap would be maintained in proper position, although the chance of losing more than one or two studs, even in the absence of a securing wire, is very remote.

A continuous foot cap may, of course, be applied advantageously to generators of various types other than that illustrated herein.

The generator supporting elements which are illustrated in the form of projecting feet or lugs, arranged near the lower part of the generator, may, of course, assume various other forms and be otherwise located with respect to the generator frame.

I do not desire to limit myself to the details of the foot cap described, as this form was selected simply for the purpose of illustrating one of the various forms which the invention may assume. I desire, therefore, to cover suitable equivalent means for accomplishing the desired result as long as said means fall within the scope of the appended claims.

Having thus described my invention, what I claim as new and desire to secure by Letters Patent of the United States is:

1. The combination with a car lighting generator having a pair of oppositely arranged supporting elements adapted to rest on supporting members, of a continuous foot cap secured to said generator and adapted to coöperate with said supporting members to maintain said generator supporting elements in engagement with said supporting members.

2. The combination with a car lighting generator having a plurality of supporting elements adapted to rest on supporting cross-bars, of a continuous foot cap for maintaining said supporting elements in proper engagement with said cross-bars, said continuous foot cap being secured to said generator at a plurality of points of attachment, whereby the security of such attachment is not dependent on the security of each individual attachment.

3. In combination, a car lighting generator having opposite pairs of downwardly extending supporting lugs, each pair being adapted to rest on one of a pair of substantially parallel supporting cross-bars, and a continuous foot cap for securing each of a pair of oppositely disposed lugs to said cross-bars.

4. In combination, a car lighting generator having opposite pairs of downwardly extending supporting lugs, each pair being adapted to rest on one of a pair of substantially parallel supporting cross-bars, and a continuous foot cap for securing each of a pair of oppositely disposed lugs to said cross-bars, said foot cap being bolted to said generator at a plurality of points.

5. In combination, a car lighting generator having opposite pairs of downwardly extending supporting lugs, each pair being adapted to rest on one of a pair of substantially parallel supporting cross-bars, and a continuous foot cap for securing each of a pair of oppositely disposed lugs to said cross-bars, said foot cap being bolted to each of said opposite lugs and being also bolted directly to the generator frame.

6. In combination, a car lighting generator having opposite pairs of downwardly extending supporting lugs, each pair being adapted to rest on one of a pair of substantially parallel supporting cross-bars, and a continuous foot cap for securing each of a pair of oppositely disposed lugs to said cross-bars, said foot cap being bolted to each of said oppositely disposed lugs by studs arranged on each side of the adjacent cross-bar, and in addition being bolted directly to the generator frame by a stud arranged between said lugs.

7. A means for supporting a generator comprising a plurality of supporting bars substantially circular in cross section, a plurality of integral lugs on the generator, each provided with a portion shaped to partially surround a section of one of said supporting bars, and securing means provided with a plurality of portions, each portion adapted to coöperate with a generator lug to completely surround the corresponding portion of a supporting bar, said securing means being rigidly secured to the generator structure.

8. Means for supporting a generator comprising a plurality of supporting bars substantially circular in cross section, a plurality of lugs on the generator each provided with a portion shaped to partially surround a section of one of said supporting bars, a securing means provided with a plurality of recessed portions, each recessed portion being adapted to coöperate with a lug on the generator to completely surround the corresponding portion of a supporting bar, and means for fastening said means to each generator lug, said securing means being rigidly mounted on the generator structure.

9. Means for supporting a generator comprising a plurality of supporting bars, a plurality of integral lugs on the generator, each lug provided with a portion shaped to partially surround a section of one of said supporting bars, a securing means provided with a plurality of recessed portions, each recessed portion adapted to coöperate with a generator lug to completely surround the corresponding portion of a suspension bar, and means for fastening the securing means to the generator lugs on each side of each supporting bar, said securing means being rigidly fastened to the generator structure.

In witness whereof, I have hereunto subscribed my name in the presence of two witnesses.

WILLIAM L. BLISS.

Witnesses:
WM. A. TURBAYNE,
F. J. CALLAHAN.